US011721156B2

(12) United States Patent
Vera

(10) Patent No.: US 11,721,156 B2
(45) Date of Patent: Aug. 8, 2023

(54) SYSTEM AND METHOD OF SETTING AND CHARGING A FIXED DONATION AMOUNT

(71) Applicant: Juan Carlos Vera, Roberts Creek (CA)

(72) Inventor: Juan Carlos Vera, Roberts Creek (CA)

( * ) Notice: Subject to any disclaimer, the term of this patent is extended or adjusted under 35 U.S.C. 154(b) by 200 days.

(21) Appl. No.: 17/347,555

(22) Filed: Jun. 14, 2021

(65) Prior Publication Data

US 2021/0390816 A1    Dec. 16, 2021

Related U.S. Application Data

(60) Provisional application No. 63/038,543, filed on Jun. 12, 2020.

(51) Int. Cl.
*G06Q 20/20* (2012.01)
*G07F 7/08* (2006.01)
(Continued)

(52) U.S. Cl.
CPC ......... *G07F 7/0886* (2013.01); *G06Q 20/204* (2013.01); *G06Q 20/3223* (2013.01);
(Continued)

(58) Field of Classification Search
CPC ............... G07F 7/0886; G06Q 20/204; G06Q 20/3223; G06Q 20/3278; G06Q 20/102; G06Q 20/3226; G07G 1/0018; G07G 1/06
See application file for complete search history.

(56) References Cited

U.S. PATENT DOCUMENTS 5,506,393 A * 4/1996 Ziarno ............... G06Q 20/04
235/380
5,663,547 A * 9/1997 Ziarno ............... G06Q 20/04
902/4
(Continued)

FOREIGN PATENT DOCUMENTS

DE    102018114313 B3 *   5/2019
EP         1026642 A1 *   8/2000   ............. G06Q 20/00
(Continued)

OTHER PUBLICATIONS https://efa-net.eu/news/whydonate-and-ing-launch-contactless-collection-box (Year: 2018).*
(Continued)

*Primary Examiner* — Ashford S Hayles

(57) ABSTRACT

A system and method of setting and charging a fixed donation amount provides a convenient contactless payment for donations. The system includes at least one portable donation terminal and at least one administrator personal computing (PC) device. The portable donation terminal is communicably coupled to the administrator PC device. An administrator may be a cashier, a clerk, a clergy member, and so on. The method begins by outputting a fixed charging amount with the portable donation terminal. Donation information is received through the portable donation terminal. The donation information is processed for the fixed charging amount. An administrator is prompted to generate a receipt of the fixed charging amount for the donation information. At least one remote server may also be communicably coupled to the administrator PC device in order to provide a reference identifier for the receipt. The receipt is outputted with the administrator PC device.

13 Claims, 15 Drawing Sheets

(51) Int. Cl.
    *G07G 1/00*     (2006.01)
    *G06Q 20/32*     (2012.01)
    *G07G 1/06*     (2006.01)

(52) U.S. Cl.
    CPC ....... *G06Q 20/3278* (2013.01); *G07G 1/0018* (2013.01); *G07G 1/06* (2013.01)

(56) References Cited

U.S. PATENT DOCUMENTS

| | | | |
|---|---|---|---|
| 5,869,825 A * | 2/1999 | Ziarno | A47G 33/00 705/317 |
| 6,253,998 B1 * | 7/2001 | Ziarno | G07F 19/20 235/472.01 |
| 9,437,085 B1 * | 9/2016 | Rempe | G06Q 20/34 |
| 2004/0034563 A1 * | 2/2004 | Brissette | G07F 7/025 705/14.1 |
| 2004/0111281 A1 * | 6/2004 | Witter | G06Q 30/0601 705/26.1 |
| 2005/0211771 A1 * | 9/2005 | Onozu | G06Q 20/3274 705/16 |
| 2011/0302021 A1 * | 12/2011 | Reid | G06Q 20/387 705/14.35 |
| 2012/0232980 A1 * | 9/2012 | Wald | G06Q 20/18 705/14.27 |
| 2013/0273843 A1 * | 10/2013 | Shimota | G06Q 20/3278 455/41.1 |
| 2014/0164275 A1 * | 6/2014 | Lee | G06Q 20/10 705/329 |
| 2014/0198969 A1 * | 7/2014 | McRae | G06Q 40/12 382/138 |
| 2014/0229397 A1 * | 8/2014 | Fink | G06Q 30/0279 705/329 |
| 2014/0298027 A1 * | 10/2014 | Roberts | G06Q 20/20 713/171 |
| 2015/0074010 A1 * | 3/2015 | Sabella | G06Q 30/0279 705/329 |
| 2016/0063488 A1 * | 3/2016 | Gary, Jr. | G06Q 20/22 705/39 |
| 2016/0098704 A1 * | 4/2016 | Yonke | G06Q 20/34 235/380 |
| 2016/0125482 A1 * | 5/2016 | d'Alancon | G06Q 20/22 705/329 |
| 2017/0046677 A1 | 2/2017 | Babu | |
| 2017/0091836 A1 * | 3/2017 | Luciano, Jr. | G06Q 30/0226 |
| 2017/0221045 A1 * | 8/2017 | Yonke | G06K 19/07741 |
| 2018/0121900 A1 * | 5/2018 | Spice | G06Q 30/06 |
| 2021/0073766 A1 * | 3/2021 | Gonzales | G06Q 20/3276 |

FOREIGN PATENT DOCUMENTS

| | | | |
|---|---|---|---|
| EP | 1116463 A2 * | 7/2001 | A47G 33/00 |
| KR | 20060097699 A * | 9/2006 | |
| KR | 20170063154 A * | 6/2017 | |
| KR | 101775076 B1 * | 9/2017 | |
| KR | 101811371 B1 * | 12/2017 | |
| KR | 20190086185 A * | 7/2019 | |
| WO | WO-2016195333 A1 * | 12/2016 | G06K 19/06037 |
| WO | WO-2017137265 A1 * | 8/2017 | G06F 21/86 |
| WO | WO2017137265 A1 | 8/2017 | |
| WO | WO-2018012946 A1 * | 1/2018 | G06Q 20/04 |
| WO | WO-2020012077 A1 * | 1/2020 | |

OTHER PUBLICATIONS

The Wayback Machine—https://web.archive.org/web/20191219170235/ https://www.goodbox.com/ (Year: 2019).*
The Wayback Machine—https://web.archive.org/web/20190707020306/ https://www.libertypay.co.uk/donation-boxes.html (Year: 2019).*
https://www.electronicpaymentsinternational.com/analysis/contactless-charity-donations/ (Year: 2019).*
Payter P6X User Manual Document Version 3.0 Release Date Jan. 30, 2017 (Year: 2017).*
Donation Solutions, https://www.questpaymentsystems.com/donation-solutions.html.
Charities Miss Out on More Than £80M a Year by Only Accepting Cash Donations, https://www.3blmedia.com/News/Charities-Miss-Out-More-PS80M-Year-Only-Accepting-Cash-Donations.
LibertyPay Donation boxes, https://www.libertypay.co.uk/donation-boxes.html.
GBx Mini, https://www.goodbox.com/product/gbx-mini/.

* cited by examiner

SYSTEM AND METHOD OF SETTING AND CHARGING A FIXED DONATION AMOUNT The current application claims a priority to the U.S. Provisional Patent application Ser. No. 63/038,543 filed on Jun. 12, 2020. The current application is filed on Jun. 14, 2021 while Jun. 12, 2021 was on a weekend.

FIELD OF THE INVENTION

The present invention generally relates to payment terminals. More specifically, the present invention sets and charges a fixed donation amount.

BACKGROUND OF THE INVENTION

Contactless payment is a convenient and secure method for consumers to make payments for transactions of goods and services. Such payment methods are becoming more increasingly common. Contactless payments can be made using a variety of contactless payment devices. Typically, debit or credit cards issued by banks come equipped with contactless payment chips (integrated circuits) to facilitate contactless payments. However, users still must interact with the payment terminal to input necessary information to complete the payment. Other means for contactless payments are also becoming increasingly common such as contactless payment devices like key fobs, smartcards, smart watches, mobile phones, and tablet computers. However, all these devices must have the correct hardware and software to be able to make contactless payments.

An objective of the present invention is to provide a wireless payment system and method that allows fast fixed-amount payments using Near Field Communication (NFC) without operator intervention for donations. The present invention presents information regarding a donation including a unique numerical identifier per donation generated by a donation service system and printed in the donation voucher that allows the donor to accumulate the donations and obtain tax receipts. Once the transaction is completed, the application sets the payment terminal ready for the next transaction without operator intervention. Additional peripheral devices such as printers can be configured in the same application to generate custom printed receipts, event tickets, vouchers, donation vouchers.

DETAIL DESCRIPTIONS OF THE INVENTION

All illustrations of the drawings are for the purpose of describing selected versions of the present invention and are not intended to limit the scope of the present invention.

Figure 1:
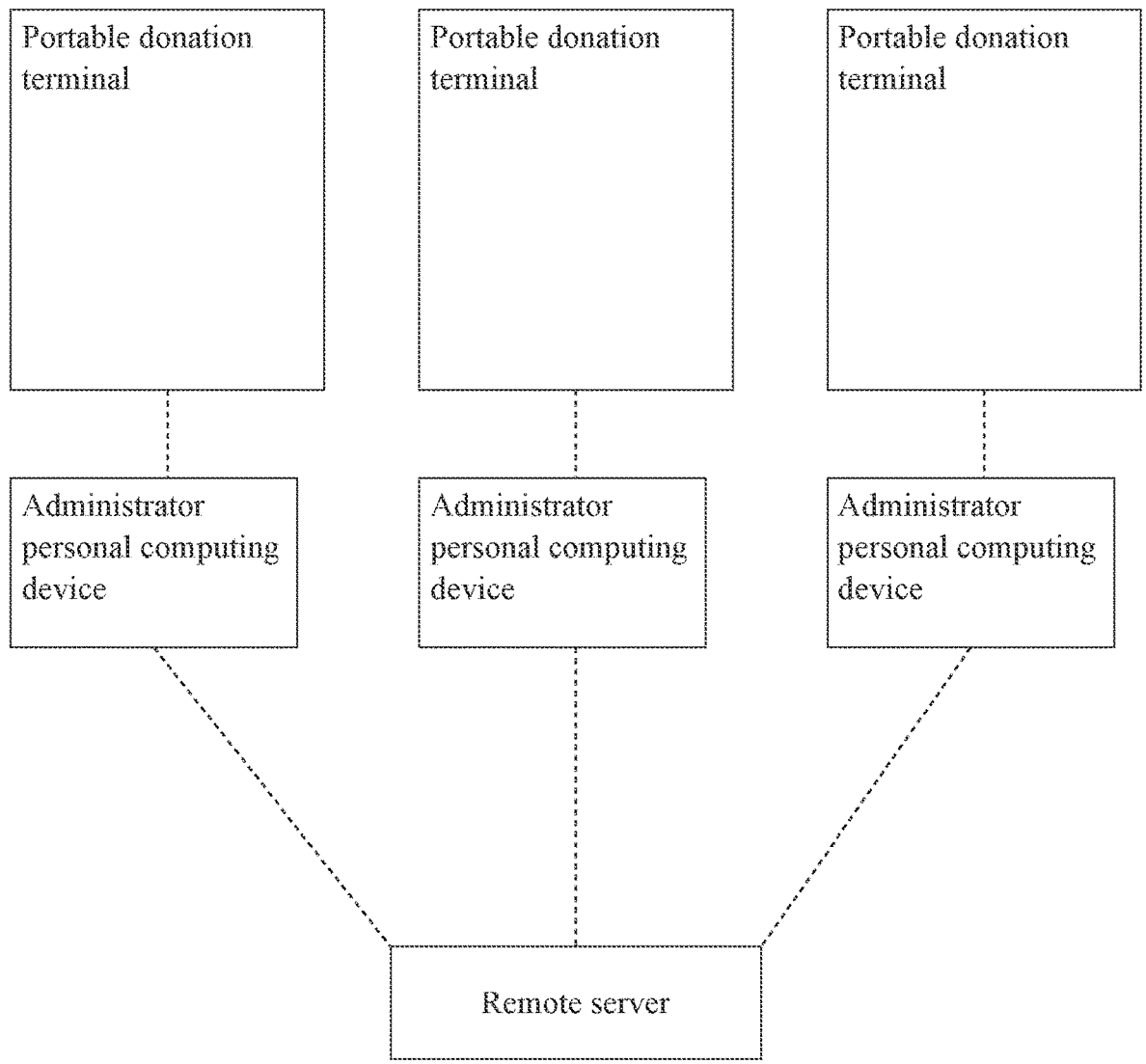
FIG. 1 is a block diagram for the wireless communication between an administrator personal computing (PC) device with a portable donation terminal and a remove server of the present invention.
Figure 2:
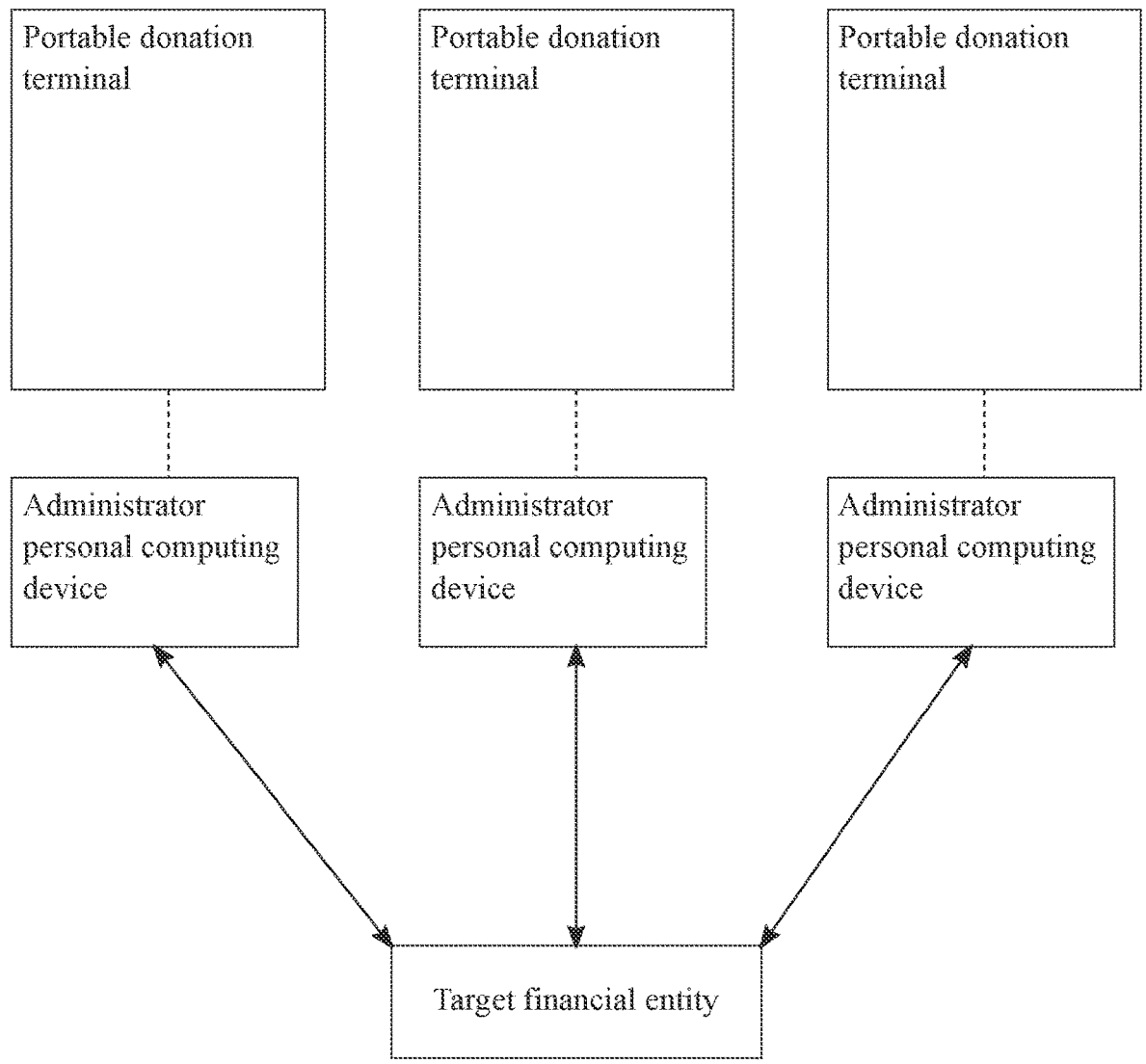
FIG. 2 is a block diagram for the wireless communication between the administrator PC device with the portable donation terminal and a target financial entity of the present invention.
Figure 3:
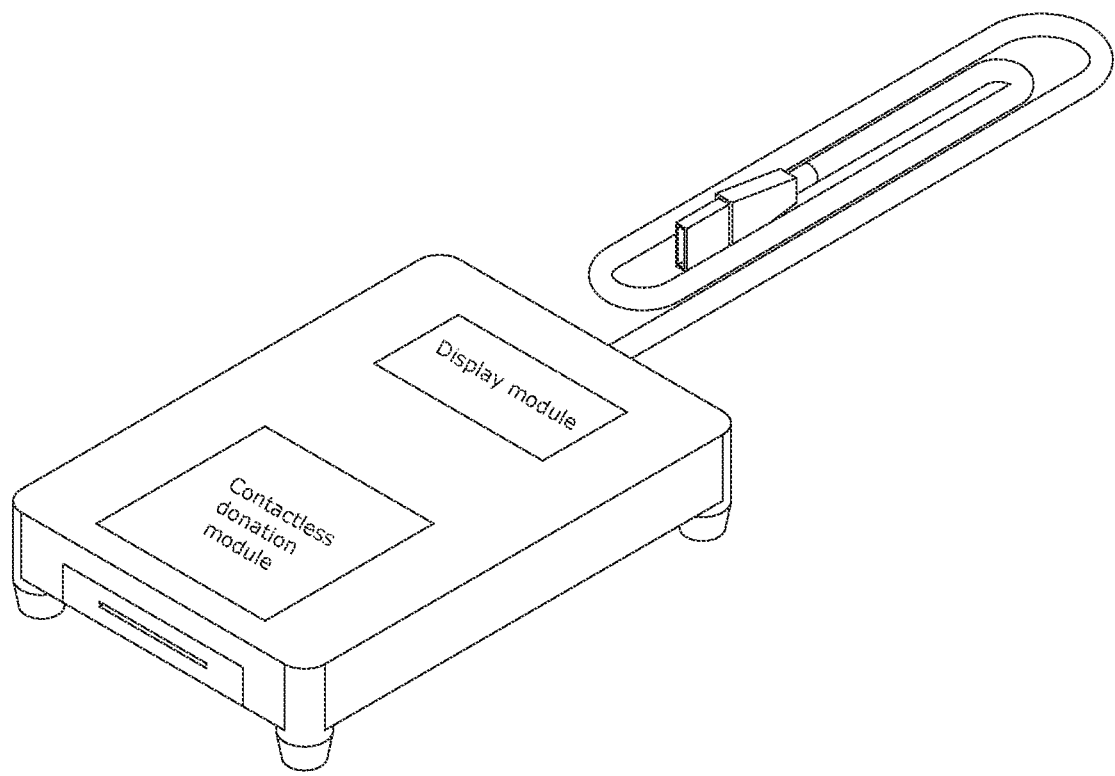
FIG. 3 is a schematic view for the portable donation terminal of the present invention.

The present invention is a system and method of setting and charging a fixed donation amount. The present invention serves a quick and convenient form of donation. More specifically, the present invention facilitates donations by requiring no input from a customer nor an administrator in order to provide a donation. A customer is encouraged to provide a donation as the present invention requires no additional time or physical cash in order to make a donation. The present invention accommodates high traffic retail stores such as convenience stores as well as religious institutions holding a service or mass. Thus, the physical system used to implement the method for the present invention includes at least one portable donation terminal and at least one administrator personal computing (PC) device, wherein the portable donation terminal is communicably coupled to the administrator PC device (Step A) thereby allowing for the wireless transmission of data, seen in FIG. 1, FIG. 2, and FIG. 3. The portable donation terminal serves as a payment reader for a credit card or other forms of cashless financial transactions. The portable donation terminal allows a customer or patron to provide a donation to the administrator account, which is preferably a registered non-profit organization or charity. Moreover, an administrator account associated with the administrator PC device is used by a non-profit organization or charity that manages fundraising operations and deploys the portable donation terminal to a vendor. The administrator account may also be associated with the administrator PC device by a fundraising company or third party that works for the non-profit organization or charity and manages the donations from the portable donation terminal. The non-profit organization or charity is preferably registered and recognized by the vendor providing the portable donation terminal. Furthermore, the non-profit organization or charity may issue tax receipts to a customer or patron that has accumulated several donation vouchers and has reached a minimum payment. Any data associated with an administrator account, which is associated with the administrator, can be accessed through the administrator PC device. The administrator PC device can be, but is not limited to, a computerized mobile phone (i.e., a "smartphone), a laptop, a tablet PC, a desktop, or a computerized watch (i.e., a "smartwatch").

Figure 4:
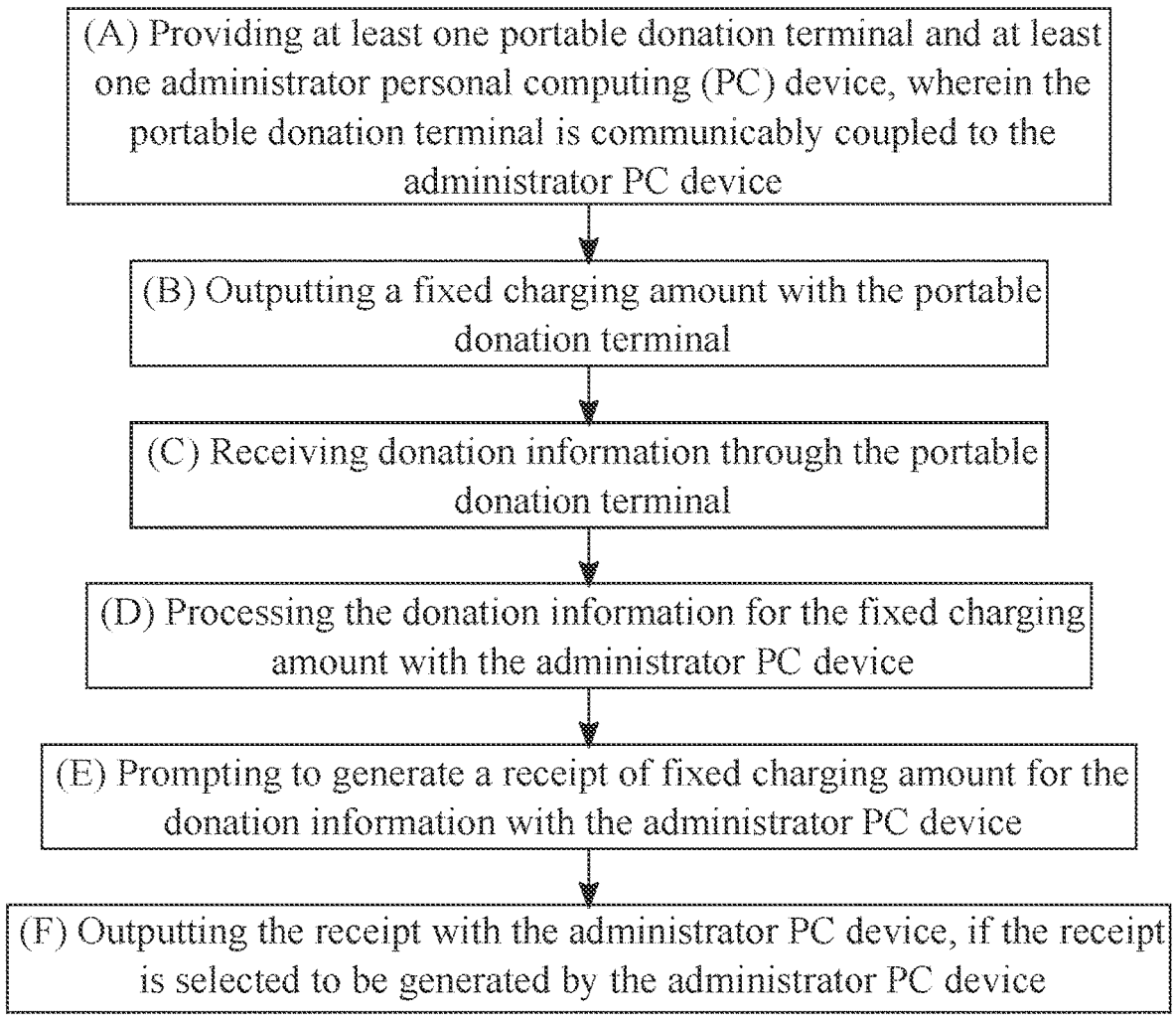
FIG. 4 is a flowchart illustrating the overall process for a method of the present invention.

The overall process for the method of the present invention includes the following steps that are implanted with the portable donation terminal and the administrator PC device. The method begins by outputting a fixed charging amount with the portable donation terminal (Step B) in order for a customer or patron to be visually alerted of how much he or she will be paying as a donation, as seen in FIG. 4. The fixed charging amount is a designated amount of money that the customer or patron may provide as a donation. In order to wirelessly retrieve payment from the customer or patron, donation information is then received through the portable donation terminal (Step C). Donation information may include, but is not limited to, a bank account number, a routing number, and so on. Moreover, the donation information is associated with the administrator account. The donation information is processed for the fixed charging amount with the administrator PC device (Step D) thereby applying the fixed charging amount to the payment card for the administrator (i.e., the non-profit organization or charity associated with the administrator account). In order to view and record the information regarding the transaction with the portable donation terminal, the administrator account is then prompted to generate a receipt of fixed charging amount for the donation information with the administrator PC device (Step E). The receipt of the fixed charging amount may include text such as fixed charging amount and the name of the administrator account (i.e. the non-profit organization or charity). The receipt may be necessary for any tax information that may need to be reported for the customer or the administrator. The donation is viewed complete by the administrator as the receipt is outputted with the administrator PC device, if the receipt is selected to be generated by the administrator PC device (Step F).

Figure 5:
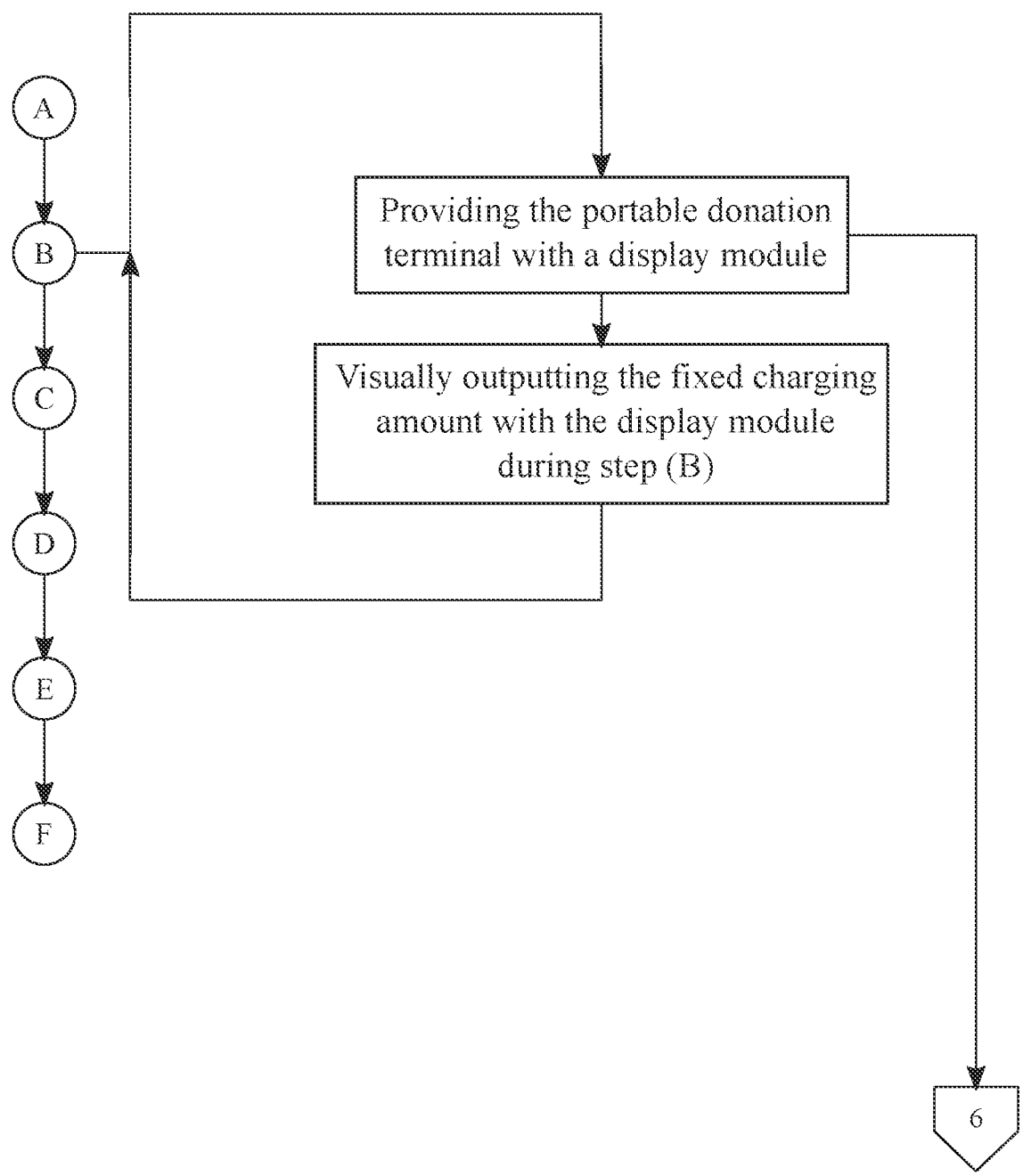
FIG. 5 is a flowchart illustrating the subprocess of visually outputting a fixed charging amount with the present invention.
Figure 6:
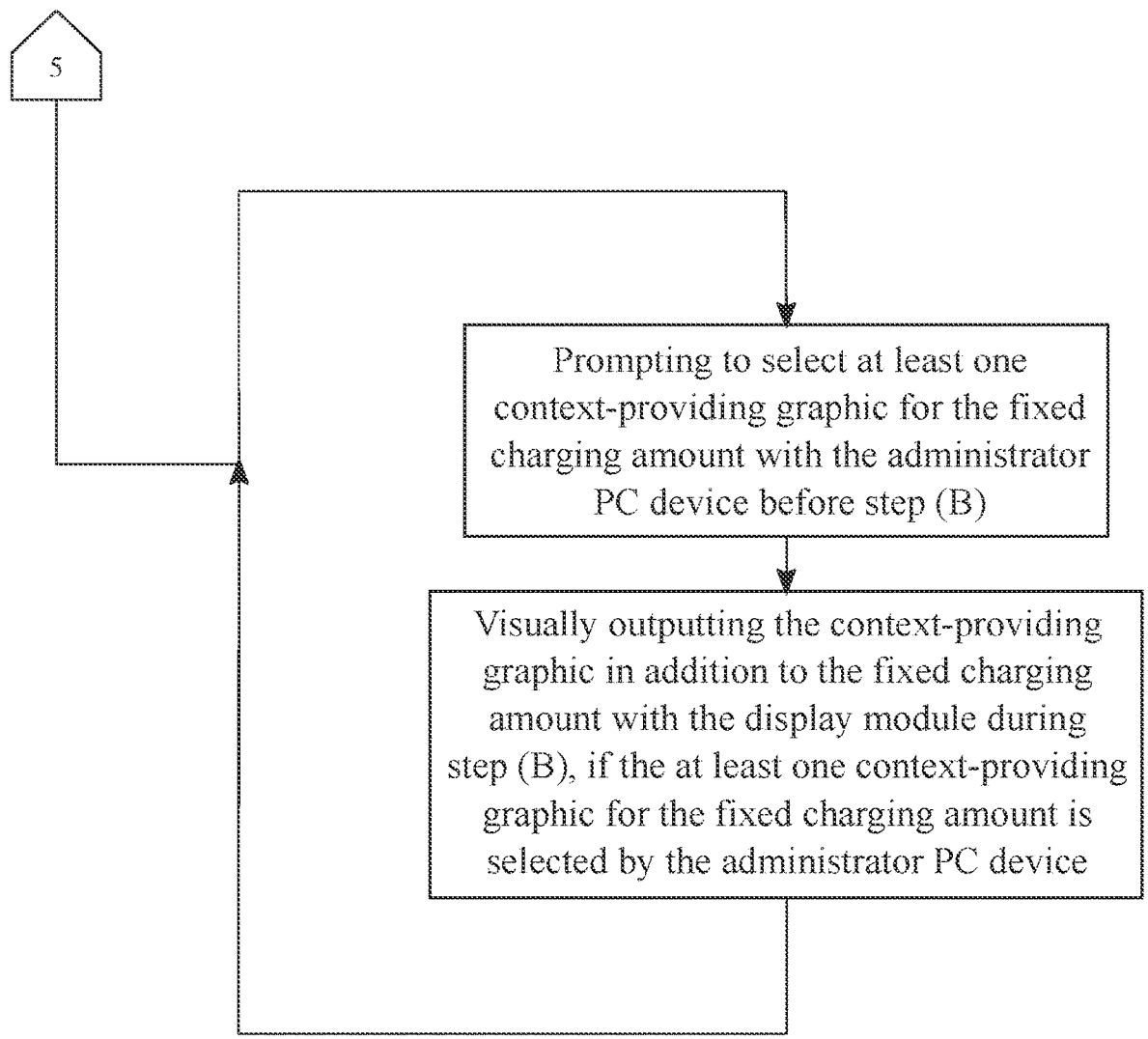
FIG. 6 is a flowchart illustrating the subprocess of visually outputting a context-providing graphic with the present invention.

In order to for a customer to be made aware of what the fixed charging amount is being applied to, the portable donation terminal includes a display module, as seen in FIG. 5. The display module visually presents and alerts a customer who the administrator account is, as well as any other desired information designated by the administrator account. The display module is preferably an electrophoretic display. The fixed charging amount is visually outputted with the display module during Step B in order to get the attention of the customer and inform the customer of the fixed charging amount. In order to provide information associated with the administrator, the administrator account is prompted to select at least one context-providing graphic for fixed charging amount with the administrator PC device before Step B, as seen in FIG. 6. The at least one context-providing graphic is preferably a logo but may include a variety of other texts and/or graphics. A customer quickly decides to whether or not to provide a donation by simply viewing the display module as the context-providing graphic is visually outputted in addition to the fixed charging amount with display module during Step B, if the at least one context-providing graphic for the fixed charging amount is selected by administrator PC device.

Figure 7:
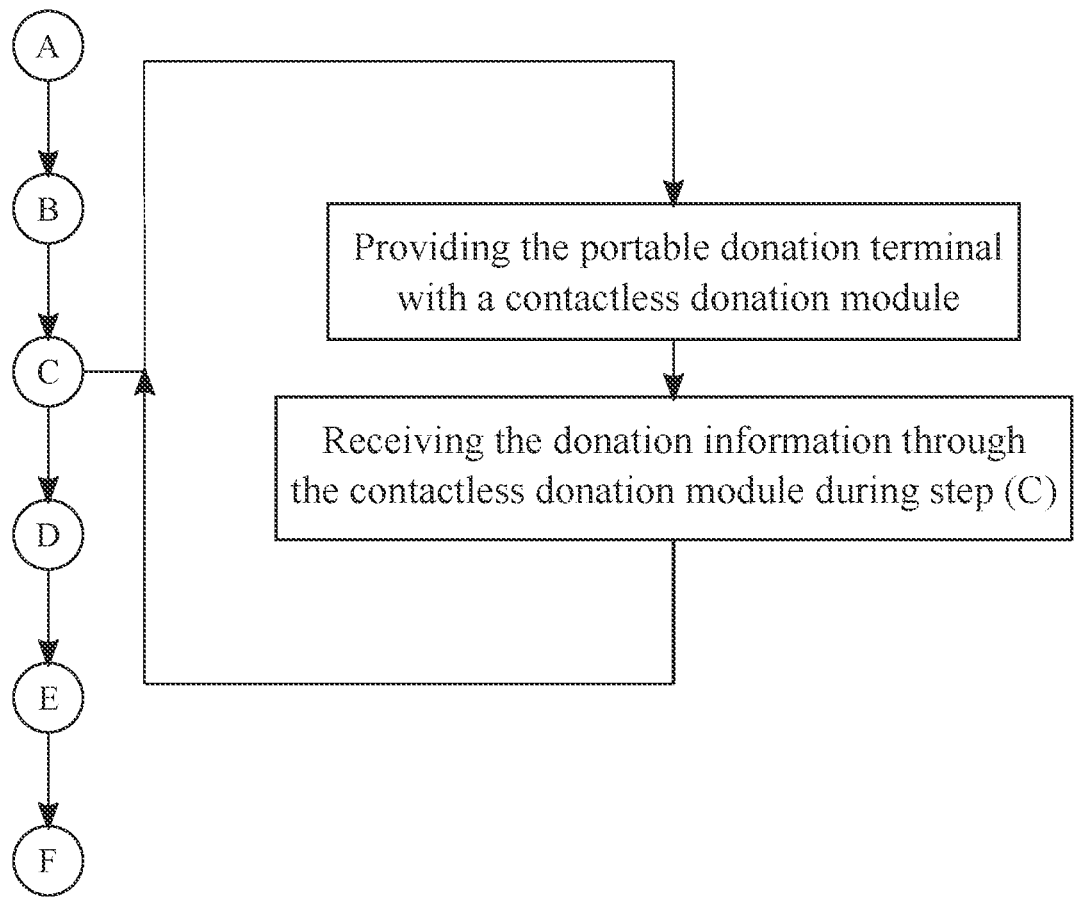
FIG. 7 is a flowchart illustrating the subprocess of receiving donation information through a contactless donation module of the portable donation terminal with the present invention.

In order to process payment by simply tapping a credit card or the like with the portable donation terminal, the portable donation terminal also includes a contactless donation module, as seen in FIG. 7. The contactless donation module includes the technology and connections to wirelessly transmit data needed to retrieve payment from the credit card or the like of the customer. The contactless donation module can be, but is not limited to, a near field communication (NFC) module, a personal area network (PAN) module (e.g., Bluetooth), and a low-energy PAN module (e.g. low-energy Bluetooth). The donation information is received through the contactless donation module during Step C, which maintains the wireless connection and the convenience for a customer.

Figure 8:
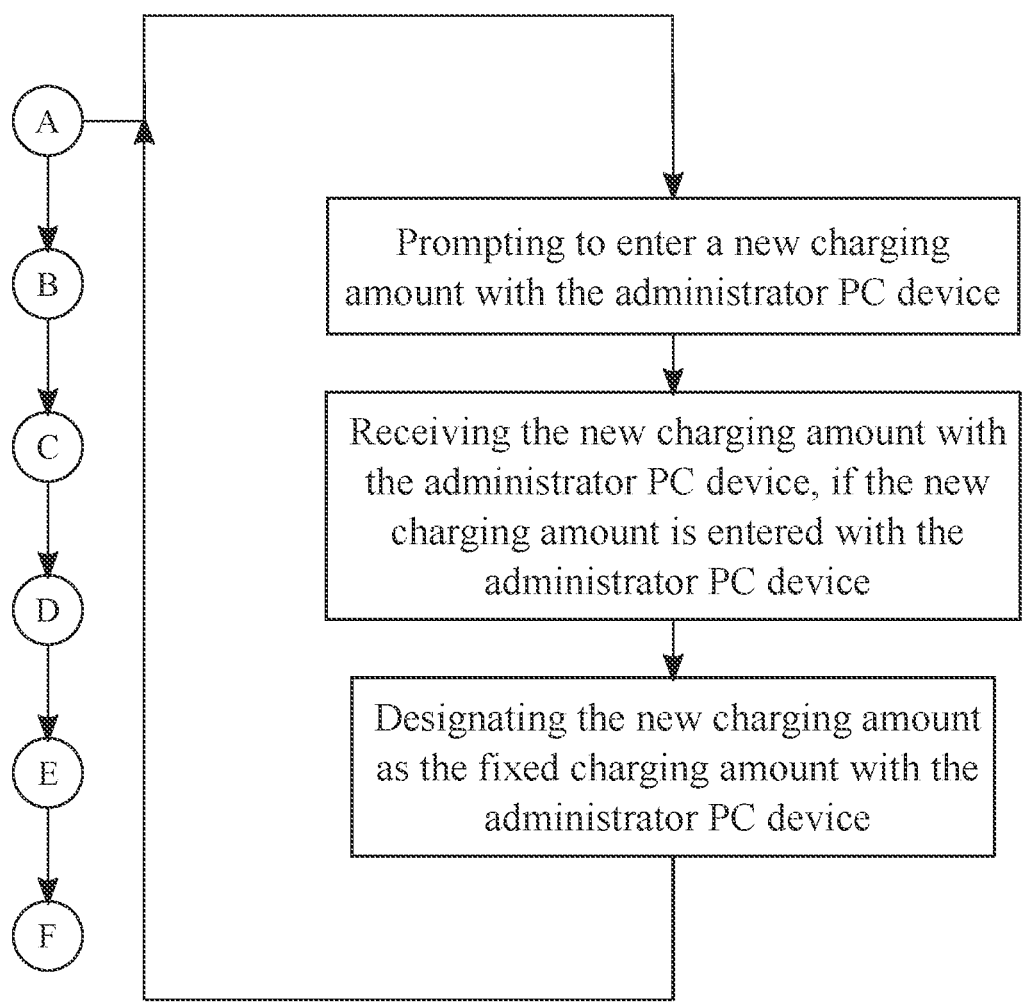
FIG. 8 is a flowchart illustrating the subprocess of designating a new charging amount as the fixed charging amount with the present invention.

In the event, the administrator wishes to increase or decrease the donation per customer, the administrator account is prompted to enter a new charging amount with the administrator PC device, as seen in FIG. 8. The new charging amount is a different donation amount than that of the fixed charging amount. In order for the portable donation terminal to accurately process the new charging amount, the new charging amount is received with the administrator PC device, if the new charging amount is entered with the administrator PC device via a donation service system associated with the administrator account. The new charging amount is designated as the fixed charging amount with the administrator PC device, thereby accurately applying a new desired charge to the credit card or the like of a customer as a donation.

Figure 9:
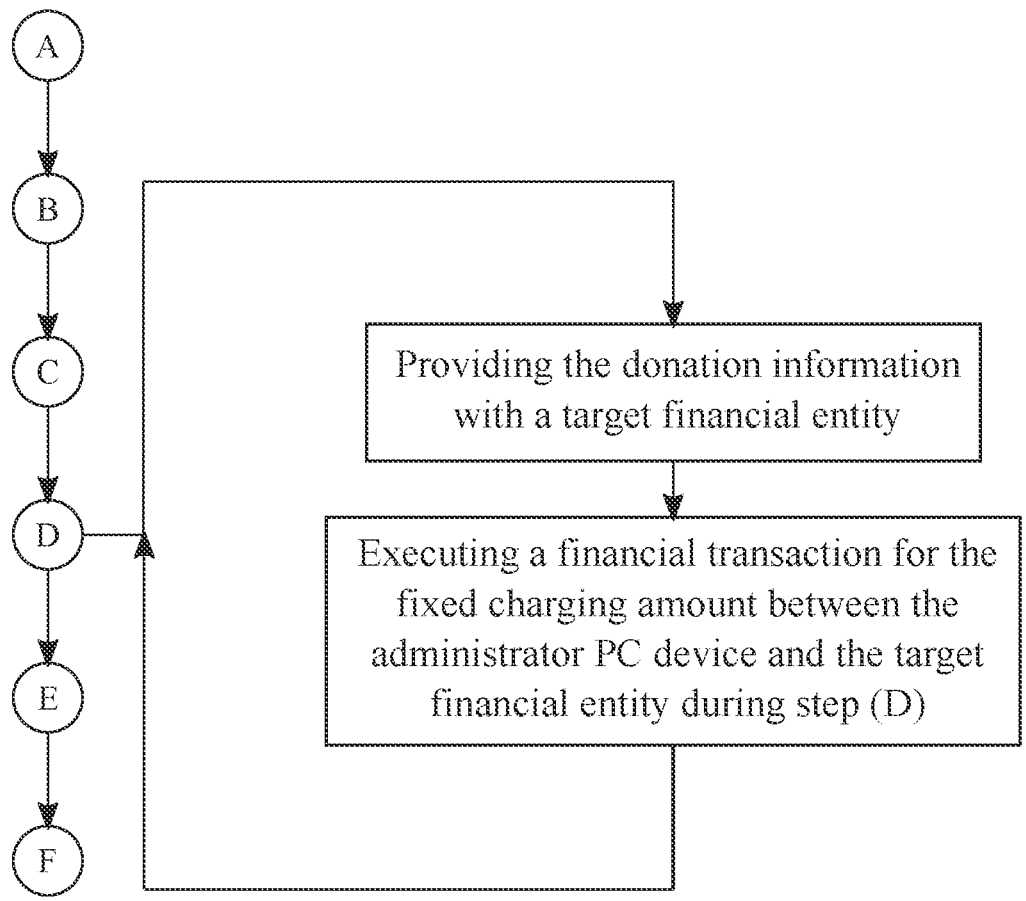
FIG. 9 is a flowchart illustrating the subprocess of executing a financial transaction for the fixed charging amount between the administrator PC device and a target financial entity of the present invention.

In order for the administrator to receive each fixed charging amount processed from a credit card or the like of a customer, the donation information includes a target financial entity, as seen in FIG. 9. The target financial entity is associated with the administrator account and holds the debit/credit funds that is retrieved with the portable donation terminal and processed by the administrator PC device. A financial transaction is executed for the fixed charging amount between the administrator PC device and the target financial entity during Step D. The financial transaction processes the donation of the customer with the portable donation terminal.

Figure 10:
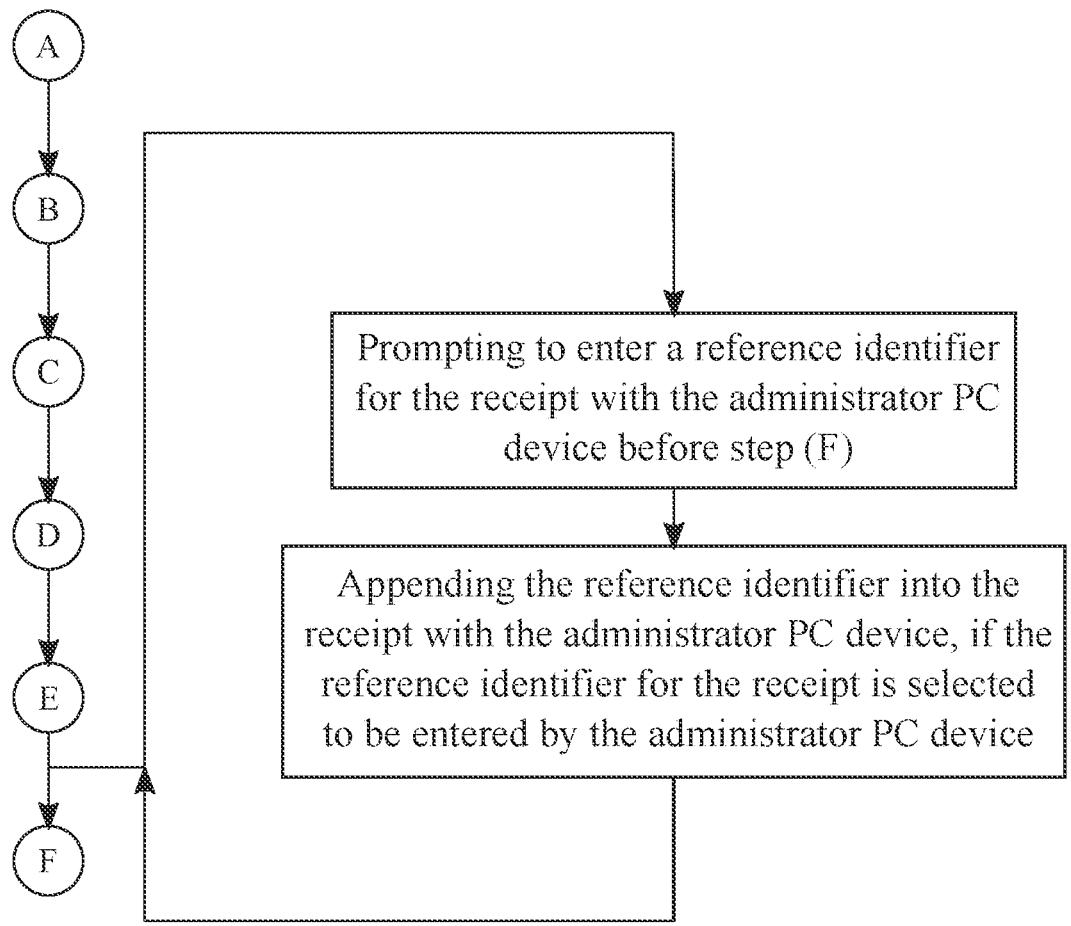
FIG. 10 is a flowchart illustrating the subprocess of entering a reference identifier with the administrator PC device and appending the reference identifier into the receipt with the present invention.

In order for the administrator to keep track of each donation, the administrator account is prompted to enter a reference identifier for the receipt with the administrator PC device before Step F, as seen in FIG. 10. The reference identifier may be a reference number or a series of numbers and letters that is associated with a corresponding donation. The administrator account may view and search for a specific donation as the reference identifier is appended into the receipt with the administrator PC device, if the reference identifier for the receipt is selected to be entered by the administrator PC device.

Figure 11:
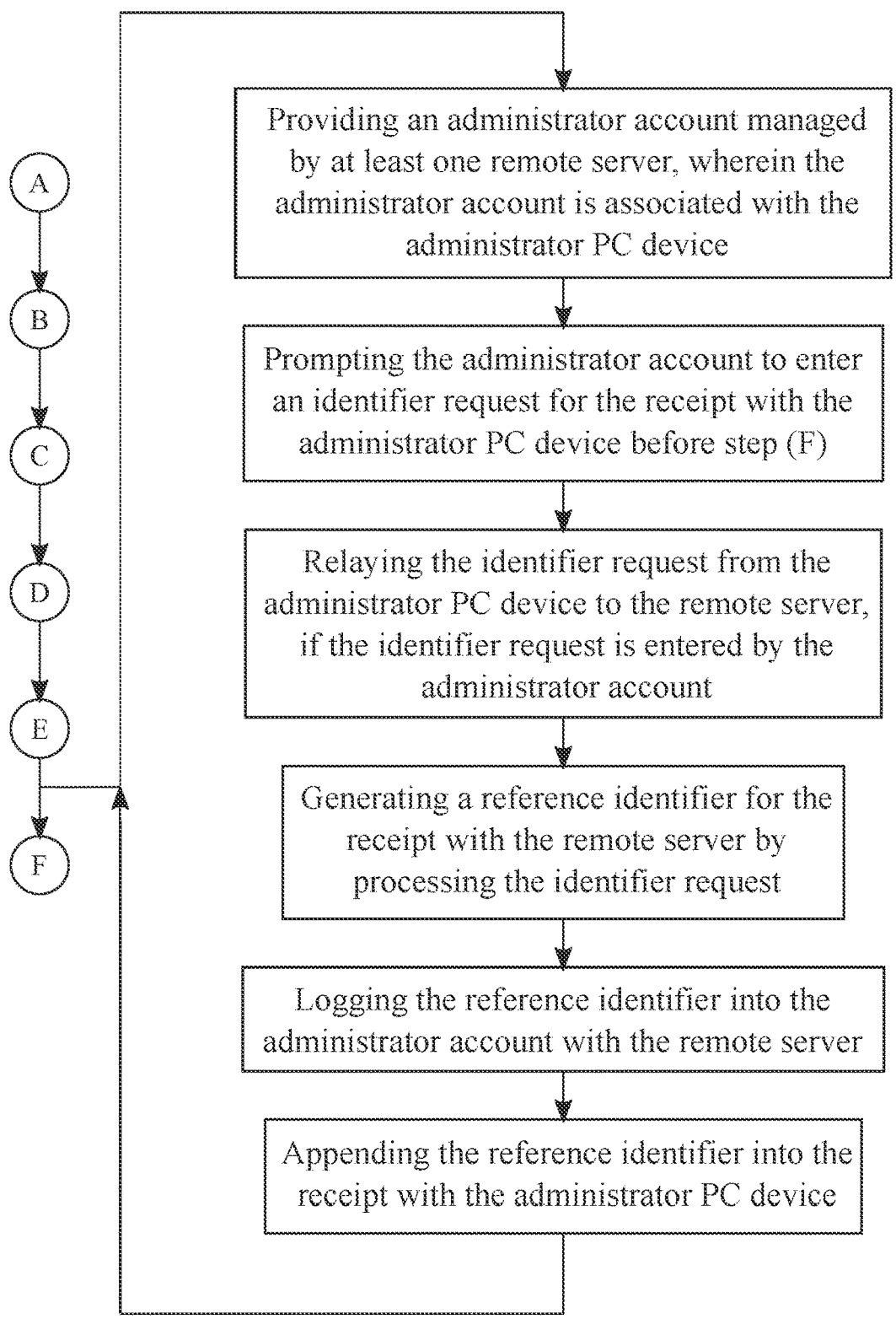
FIG. 11 is a flowchart illustrating the subprocess of generating a reference identifier for the receipt with a remote server and appending the reference identifier into the receipt with the present invention.

In the preferred embodiment for present invention, the present invention further includes an administrator account that is managed by at least one remote server, wherein the administrator account is associated with the administrator PC device, as seen in FIG. 11. The at least one remote server manages each receipt as well as each financial transaction. In order to differentiate between each receipt and each financial transaction, the administrator account is prompted to enter an identifier request for the receipt with the administrator PC device before Step F. In order to receive a unique identifier for the receipt, the identifier request is relayed from the administrator PC device to the remote server, if the identifier request from the administrator PC device. A reference identifier for the receipt is generated with the remote server by processing the identifier request, thereby facilitating the recording of each financial transaction and maintaining security for each financial transaction. Moreover, each receipt is safely stored and easily located as the reference identifier is logged with the remote server and is then appended into the receipt with the administrator PC device.

Figure 12:
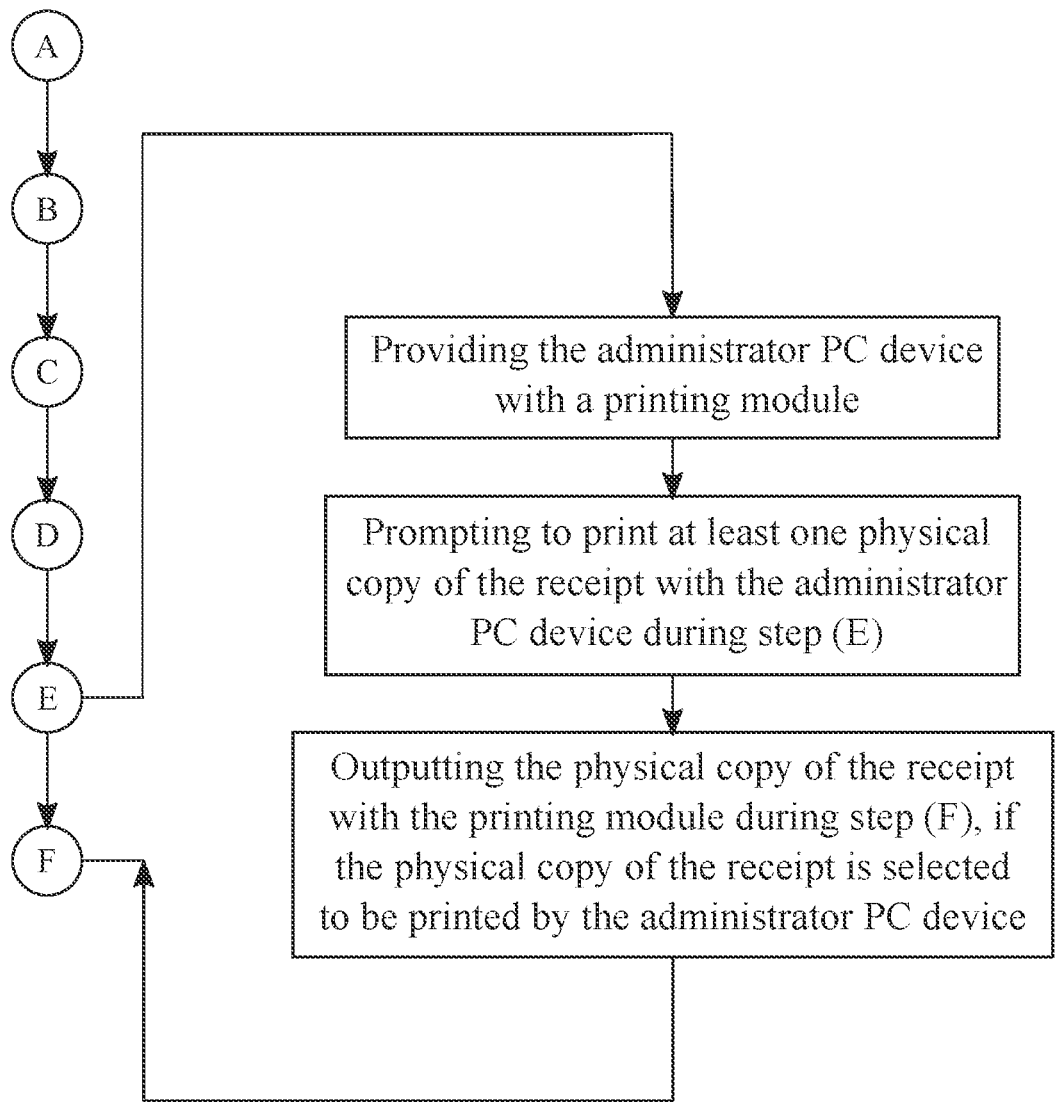
FIG. 12 is a flowchart illustrating the subprocess of outputting a physical copy of the receipt with a printing module of the administrator PC device with the present invention.

In the event the customer requests for a physical copy of the receipt or the administrator prefers to have a physical copy of the receipt for his or her records, the administrator PC device also includes a printing module, as seen in FIG. 12. The printing module is preferably a printer that is wirelessly connected with the administrator PC device. In order to print a specific receipt, the administrator is prompted to print at last one physical copy of the receipt with the administrator PC device during Step E. In order to have a physical record of the donation, the physical copy of the receipt is outputted with the printing module during Step F, if the physical copy of the receipt is selected to be printed by the administrator PC device.

Figure 13:
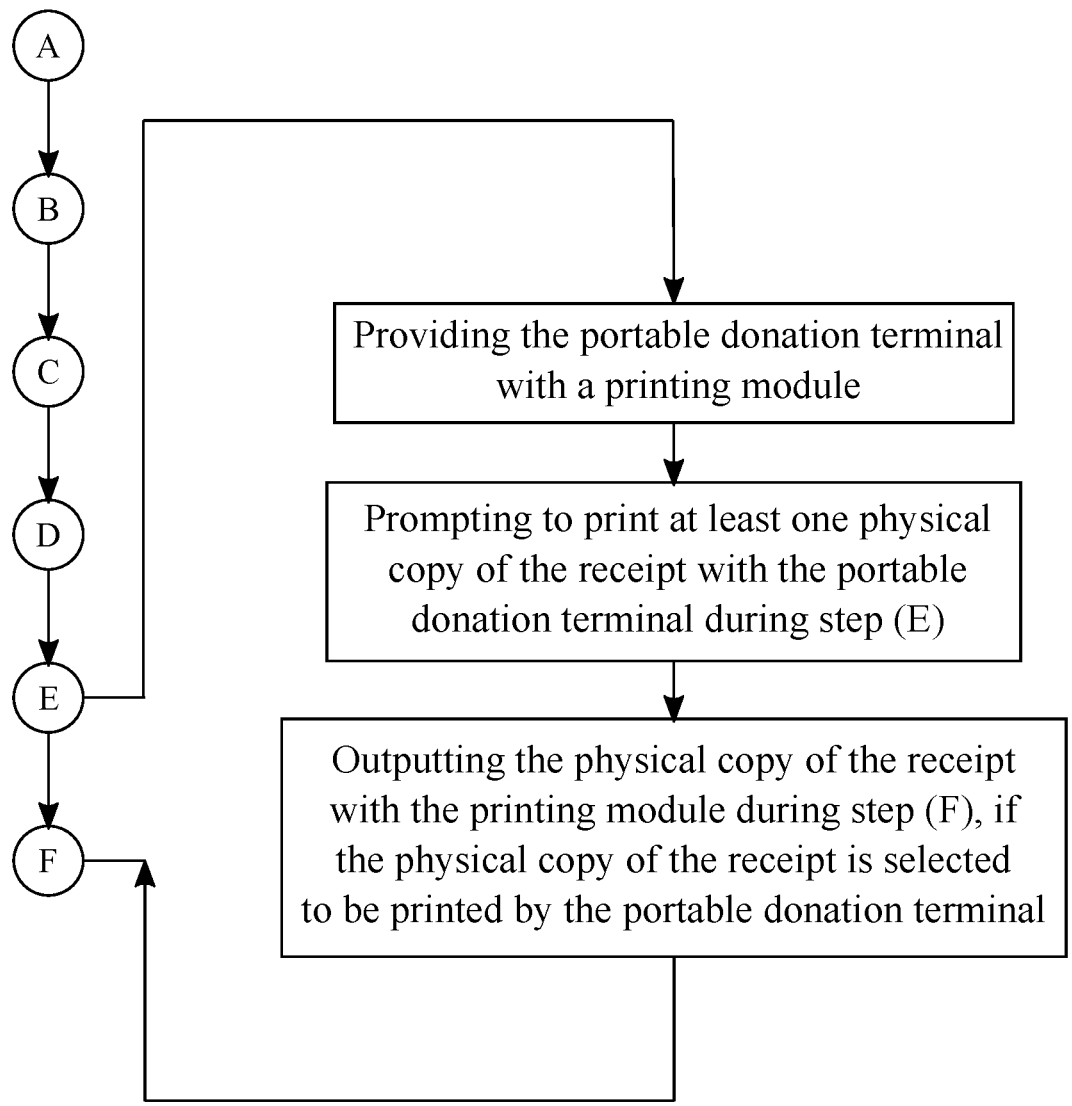
FIG. 13 is a flowchart illustrating the subprocess of outputting a physical copy of the receipt with a printing module of the portable donation terminal with the present invention.

Similarly, the portable donation terminal may include a printing module in some embodiments of the present invention, as seen in FIG. 13. In these embodiments of the present invention, the portable donation terminal directly dispenses a physical copy of the receipt. If the customer requests for a physical copy or the administrator prefers a physical copy, the administrator is prompted to print at least one physical copy of the receipt with the portable donation terminal during Step E. The customer is then given the physical copy of the receipt by the administrator, or the administrator adds the physical copy of the receipt to his or her records as the physical copy of the receipt is outputted with the printing module during Step F, if the physical copy of the receipt is selected to be printed by the portable donation terminal.

Figure 14:
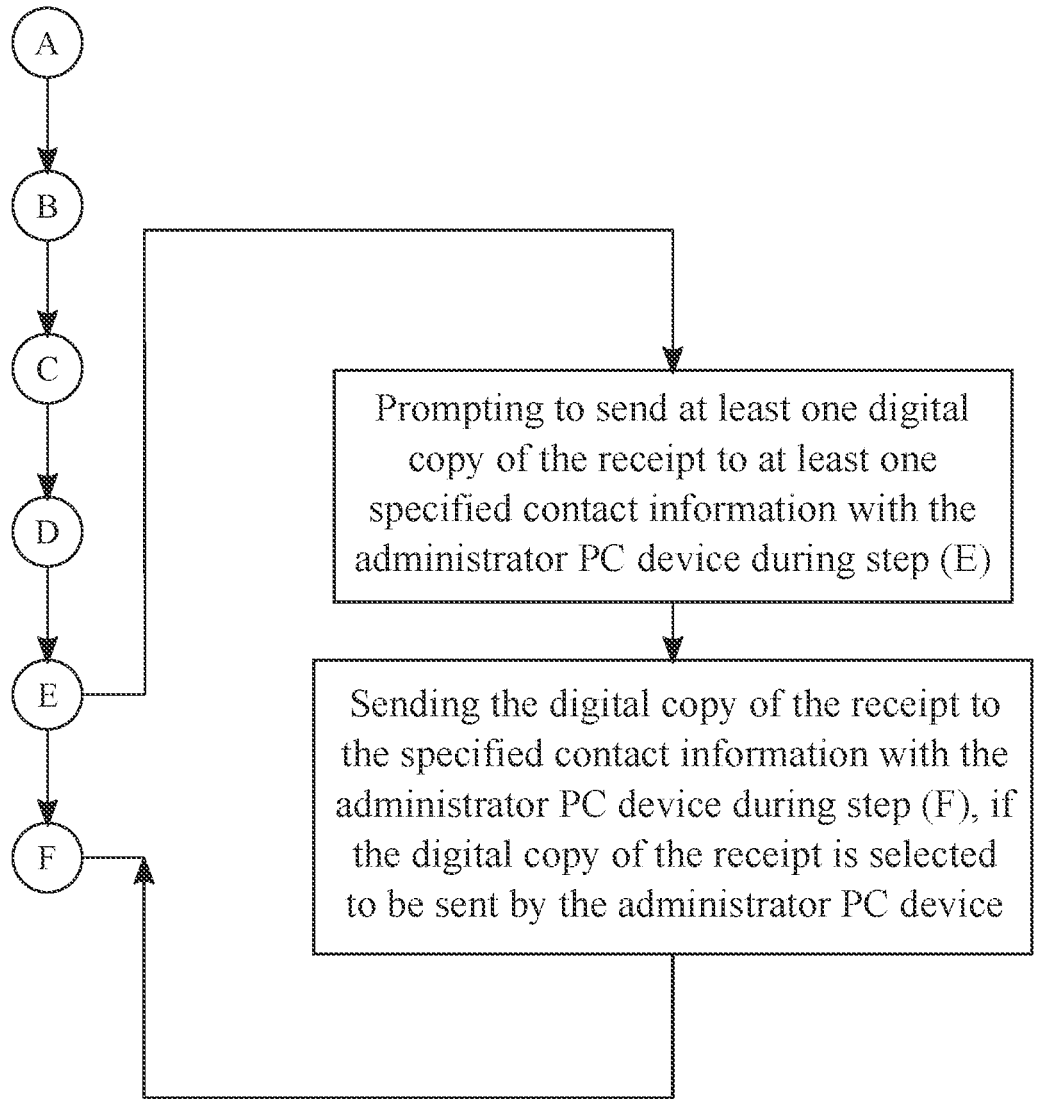
FIG. 14 is a flowchart illustrating the subprocess of sending a digital copy of the receipt to a specified contact information with the administrator PC device with the present invention.

In the event the customer or the administrator requires an electronic record of a specific donation, the administrator is prompted to send at least one digital copy of the receipt to at least one specified contact information with the administrator PC device during Step E, as seen in FIG. 14. The at least one digital copy presents and records any financial information associated with the donation. The at least one specified contact information may either be an email address associated with the administrator or the customer. The electronic record may be viewed and saved with a smart device of the customer or the administrator PC device of the administrator account as the digital copy of the receipt is sent to the specified contact information with the administrator PC device during Step F, if the digital copy of the receipt is selected to be sent by the administrator PC device.

Figure 15:
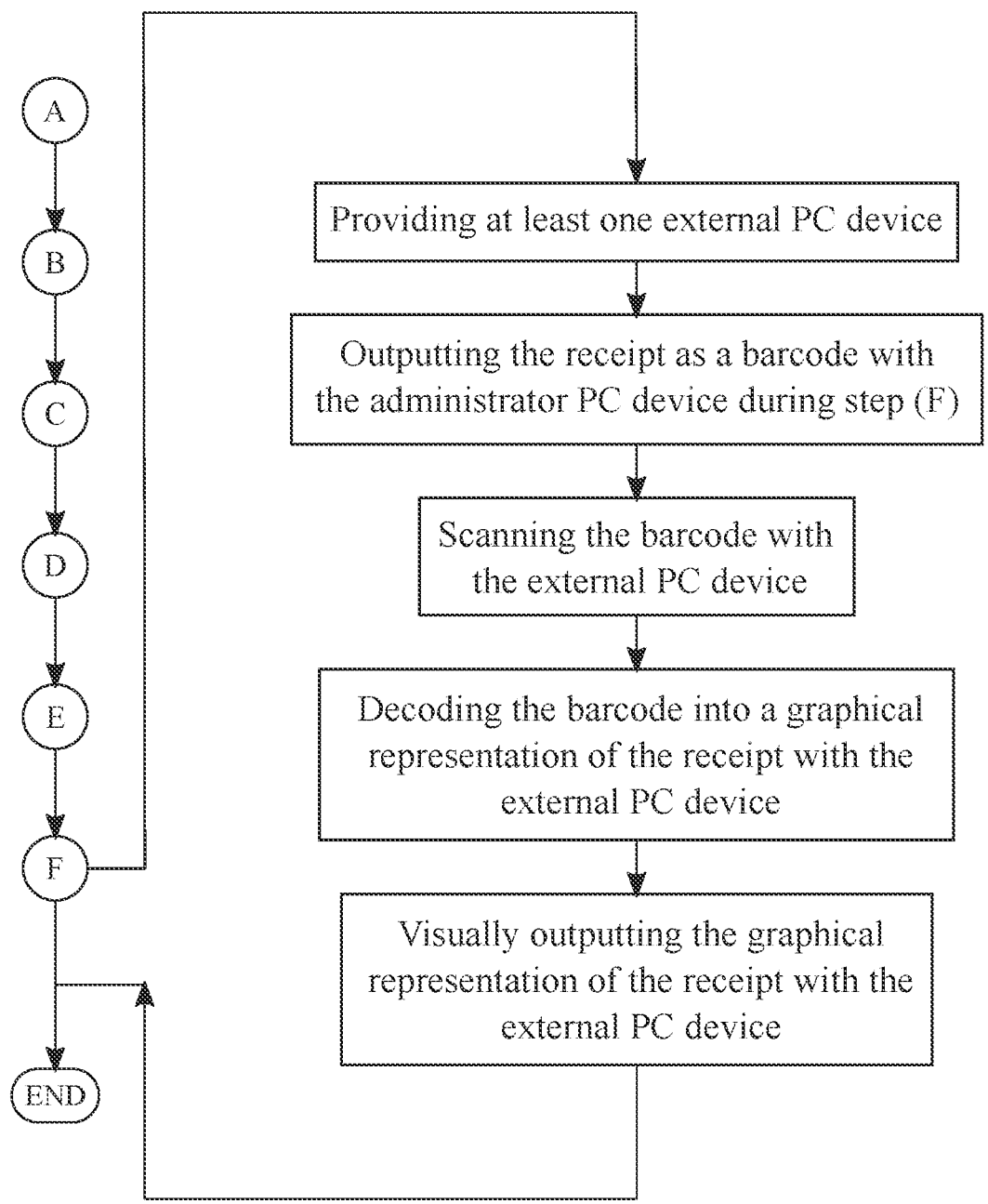
FIG. 15 is a flowchart illustrating the subprocess visually outputting a graphical representation of the receipt with the present invention.

In order to facilitate the searching and viewing of a specific donation, the system further includes at least one external PC device, as seen in FIG. 15. The at least one external PC device is preferably a scanner such as a barcode scanner or a smart camera of a smart device such as a smart phone. In order for the at least one external PC device to scan a receipt, the receipt is outputted a barcode with the administrator PC device during Step F. The barcode is then scanned with the external PC device, thereby retrieving any financial information associated with the donation. The financial information associated with the donation is retrieved as the barcode is decoded into a graphical representation of the receipt with the external PC device. The graphical representation of the receipt is visually outputted with the external PC device for the viewing and storing of the customer or the administrator.

Although the invention has been explained in relation to its preferred embodiment, it is to be understood that many other possible modifications and variations can be made without departing from the spirit and scope of the invention as hereinafter claimed.

What is claimed is:

1. A method of setting and charging a fixed donation amount, the method comprises the steps of:
   (A) providing at least one portable donation terminal, at least one administrator personal computing (PC) device, and at least one external PC device, wherein the portable donation terminal is communicably coupled to the administrator PC device;
   (B) outputting a fixed charging amount with the portable donation terminal;
   (C) receiving donation information through the portable donation terminal;
   (D) processing the donation information for the fixed charging amount with the administrator PC device;
   (E) prompting to generate a receipt of the fixed charging amount for the donation information with the administrator PC device;
   (F) outputting the receipt with the administrator PC device, when the receipt is selected to be generated by the administrator PC device;
      outputting the receipt as a barcode with the administrator PC device during step (F);
      scanning the barcode with the external PC device;
      decoding the barcode into a graphical representation of the receipt with the external PC device; and,
      visually outputting the graphical representation of the receipt with the external PC device.

2. The method of setting and charging a fixed donation amount, the method as claimed in claim 1 comprises the steps of:
   providing the portable donation terminal with a display module; and,
   visually outputting the fixed charging amount with the display module during step (B).

3. The method of setting and charging a fixed donation amount, the method as claimed in claim 2, wherein the display module is an electrophoretic display.

4. The method of setting and charging a fixed donation amount, the method as claimed in claim 2 comprises the steps of:
   prompting to select at least one context-providing graphic for the fixed charging amount with the administrator PC device before step (B); and,
   visually outputting the context-providing graphic in addition to the fixed charging amount with the display module during step (B), when the at least one context-providing graphic for the fixed charging amount is selected by the administrator PC device.

5. The method of setting and charging a fixed donation amount, the method as claimed in claim 1 comprises the steps of:
   providing the portable donation terminal with a contactless donation module; and,
   receiving the donation information through the contactless donation module during step (C).

6. The method of setting and charging a fixed donation amount, the method as claimed in claim 5, wherein the contactless donation module is selected from a group consisting of: a near field communication (NFC) module, a personal area network (PAN) module, and a low-energy PAN module.

7. The method of setting and charging a fixed donation amount, the method as claimed in claim 1 comprises the steps of:
prompting to enter a new charging amount with the administrator PC device;
receiving the new charging amount with the administrator PC device, when the new charging amount is entered with the administrator PC device; and,
designating the new charging amount as the fixed charging amount with the administrator PC device.

8. The method of setting and charging a fixed donation amount, the method as claimed in claim 1 comprises the steps of:
providing the donation information with a target financial entity; and,
executing a financial transaction for the fixed charging amount between the administrator PC device and the target financial entity during step (D).

9. The method of setting and charging a fixed donation amount, the method as claimed in claim 1 comprises the steps of:
providing an administrator account managed by at least one remote server, wherein the administrator account is associated with the administrator PC device;
prompting the administrator account to enter an identifier request for the receipt with the administrator PC device before step (F);
relaying the identifier request from the administrator PC device to the remote server, when the identifier request is entered by the administrator account;
generating a reference identifier for the receipt with the remote server by processing the identifier request;
logging the reference identifier into the administrator account with the remote server; and,
appending the reference identifier into the receipt with the administrator PC device.

10. The method of setting and charging a fixed donation amount, the method as claimed in claim 1 comprises the steps of:
providing the administrator PC device with a printing module;
prompting to print at least one physical copy of the receipt with the administrator PC device during step (E); and,
outputting the physical copy of the receipt with the printing module during step (F), when the physical copy of the receipt is selected to be printed by the administrator PC device.

11. The method of setting and charging a fixed donation amount, the method as claimed in claim 1 comprises the steps of:
providing the portable donation terminal with a printing module;
prompting to print at least one physical copy of the receipt with the portable donation terminal during step (E); and,
outputting the physical copy of the receipt with the printing module during step (F), when the physical copy of the receipt is selected to be printed by the portable donation terminal.

12. The method of setting and charging a fixed donation amount, the method as claimed in claim 1 comprises the steps of:
prompting to send at least one digital copy of the receipt to at least one specified contact information with the administrator PC device during step (E); and,
sending the digital copy of the receipt to the specified contact information with the administrator PC device during step (F), when the digital copy of the receipt is selected to be sent by the administrator PC device.

13. The method of setting and charging a fixed donation amount, the method as claimed in claim 1 comprises the steps of:
prompting to enter a reference identifier for the receipt with the administrator PC device before step (F); and,
appending the reference identifier into the receipt with the administrator PC device, when the reference identifier for the receipt is selected to be entered by the administrator PC device.

* * * * *